(12) United States Patent
Mack

(10) Patent No.: US 9,608,474 B2
(45) Date of Patent: Mar. 28, 2017

(54) DEVICE AND METHOD FOR THE INDUCTIVE TRANSMISSION OF ELECTRICAL ENERGY

(75) Inventor: Juergen Mack, Goeppingen (DE)

(73) Assignee: ROBERT BOSCH GMBH, Stuttgart (DE)

(*) Notice: Subject to any disclaimer, the term of this patent is extended or adjusted under 35 U.S.C. 154(b) by 327 days.

(21) Appl. No.: 14/349,895

(22) PCT Filed: Aug. 27, 2012

(86) PCT No.: PCT/EP2012/066578
§ 371 (c)(1),
(2), (4) Date: Aug. 19, 2014

(87) PCT Pub. No.: WO2013/053530
PCT Pub. Date: Apr. 18, 2013

(65) Prior Publication Data
US 2014/0354224 A1    Dec. 4, 2014

(30) Foreign Application Priority Data

Oct. 14, 2011   (DE) .................... 10 2011 084 485

(51) Int. Cl.
*H02J 7/00* (2006.01)
*H02J 7/02* (2016.01)
*H02J 5/00* (2016.01)

(52) U.S. Cl.
CPC .............. *H02J 7/025* (2013.01); *H02J 5/005* (2013.01); *H02J 7/0042* (2013.01)

(58) Field of Classification Search
CPC ...................................................... H02J 7/025
USPC ........................................................ 320/108
See application file for complete search history.

(56) References Cited

U.S. PATENT DOCUMENTS

| | | | |
|---|---|---|---|
| 6,301,138 B1* | 10/2001 | Amtmann | G06K 7/0008 235/492 |
| 2010/0176659 A1 | 7/2010 | Aoyama et al. | |
| 2011/0050164 A1 | 3/2011 | Partovi et al. | |
| 2011/0169446 A1 | 7/2011 | Kondo | |
| 2012/0019190 A1* | 1/2012 | Jones | H01M 10/44 320/101 |

FOREIGN PATENT DOCUMENTS

WO    01/31557    5/2001

* cited by examiner

*Primary Examiner* — Suresh Memula
(74) *Attorney, Agent, or Firm* — Norton Rose Fulbright US LLP

(57) ABSTRACT

A device for the inductive transmission of electrical energy, having at least one induction coil which is connected, or connectible, to a consumer and/or to a rechargeable battery, and having a communications device, which encompasses at least one control unit and is configured to modulate the load of the induction coil. It is provided that the communications device has a DC converter, whose output is connected or connectible to the consumer/the battery, and whose input is connected to the induction coil, the control unit controlling the DC converter for a load modulation.

16 Claims, 2 Drawing Sheets

DEVICE AND METHOD FOR THE INDUCTIVE TRANSMISSION OF ELECTRICAL ENERGY

FIELD OF THE INVENTION

The present invention relates to a device for the inductive transmission of electrical energy; the device has at least one induction coil, which is connected, or connectible, to a consumer and/or to a rechargeable battery, and a communications device, which includes at least one control unit and is developed to modulate the load of the induction coil. In addition, the present invention relates to a method for operating the afore-described device.

BACKGROUND INFORMATION

Devices for the inductive transmission of electrical energy are generally known from the related art. As a rule, they include a primary side, on which the energy to be transmitted is provided and transmitted, and a secondary side, which receives and processes the transmitted energy. The secondary and primary sides both have an induction coil for the inductive transmission. The induction coil of the secondary side is excited by the induction coil of the primary side and in this way routes energy into the system of the secondary side, which is supplied to a consumer or a rechargeable battery, for example. A communications device assigned to the secondary side allows the transmission of information from the secondary side to the primary side, e.g., in order to verify, prior to a charging process, that the charging process may take place, for instance because a properly developed model is involved, which safely cooperates with the charge device or the primary side. Known communications devices operate according to what is known as the load modulation method, in which the communication usually is required for regulating the energy transfer. In the load modulation method, the load of the induction coil is modulated on the secondary side. The results that come about are able to be received on the primary side and be analyzed with the aid of a corresponding evaluation unit. Such methods, for example, are used in RFID systems (RFID=radio-frequency identification/identification with the aid of electromagnetic waves). In contrast to RFID applications, in which the output to be transmitted is rather low, the outputs/energies to be transmitted in inductive energy transmission systems are considerably greater. Considerable power dissipation by the secondary communications device must therefore be expected in the load modulation. The losses reduce the efficiency of the entire system and contribute to noticeable heating, especially of the battery on the secondary side. This may become critical when predefined maximum temperatures of the battery are reached or exceeded.

SUMMARY OF THE INVENTION

The device according to the present invention is characterized in that the communications device has a DC voltage converter, whose output is connected, or connectible, to the consumer/battery, and whose input is connected to the induction coil, the control unit controlling the DC converter for modulating the load of the induction coil. In the present invention, unlike the known methods heretofore, it is therefore the case that the energy required for the load modulation is not converted into heat via a resistor, for example, but instead is supplied to the battery or to the consumer. In comparison with the devices known from related art, the power losses are effectively reduced to a considerable extent. During a communications process, the energy thus is actually transmitted from the primary side to the induction coil, but is not converted into heat but rather used to charge the battery and/or to supply the consumer, so that some type of energy recycling is accomplished. In addition, the battery is protected against critical temperatures.

According to one advantageous development of the present invention, the output of the DC converter is assigned at least one first switching element. An actuation of the first switching element may interrupt the connection to the battery or to the consumer. This makes it possible to utilize the transmitted energy for the communication in an efficient manner.

At least one capacitor is provided, which may be between the first switching element and the DC converter. The capacitor may be used for the intermediate storage of energy that is emitted by the DC converter during the communication. The first switching element may be closed by the control unit if the voltage applied at the capacitor exceeds a predefinable value, especially the battery voltage, so that an energy exchange between the capacitor and the battery is possible in the direction of the battery.

According to one advantageous further refinement of the present invention, the battery is assigned a second switching element, which is used for connecting and/or separating the battery to or from a grounded connection. For practical purposes, the second switching element is opened by the control units when charging of the battery or a supply of the consumer is to be prevented. Otherwise, the charge current or the load current would have a negative effect on the load modulation, which may possibly make it more difficult or even impossible to detect the communication on the primary side. In an especially particular manner, the control unit therefore opens the second switching element while it controls the DC converter for the load modulation. It is therefore ensured at all times that a successful communication takes place. For practical purposes, the second switching element is open even if charging of the battery may not, or may no longer, take place, for example when the battery has reached its storage capacity or a limit temperature has been exceeded.

According to one further refinement of the present invention, a free-wheeling diode is provided between the first switching element and the battery, which prevents undesired discharging of the battery and/or a capacitor disposed or switched between the induction coil and the battery. The free-wheeling diode is interconnected in such a way that it permits the current flow in the direction of the battery and thereby prevents the flowback of energy in an uncomplicated manner.

The DC converter may be especially embodied as a flyback converter or as an inverse converter. In contrast to the inverse converter, the flyback converter may feature a galvanic insulation.

The flyback converter may be assigned a third switching element, which makes a current detection of the coil current of the flyback converter on the input side unnecessary because of the fixedly defined on periods. The control unit controls the DC converter using a predefinable bit sequence, which is converted into corresponding on periods for the load modulation. The on period of the flyback converter may be predefined by the communications unit or the control device and by the desired bit length of the information to be transmitted.

The method of the present invention for operating a device, especially according to one of the afore-described specific embodiments, is characterized by the fact that the communications device has a DC converter, whose output is connected to the consumer and whose input is connected to the induction coil, the control unit controlling the DC converter for the load modulation.

Additional advantageous method steps result from the above description in connection with the device.

In the following text, the present invention is to be elucidated in greater detail with the aid of the drawing.

DETAILED DESCRIPTION

Figure 1:
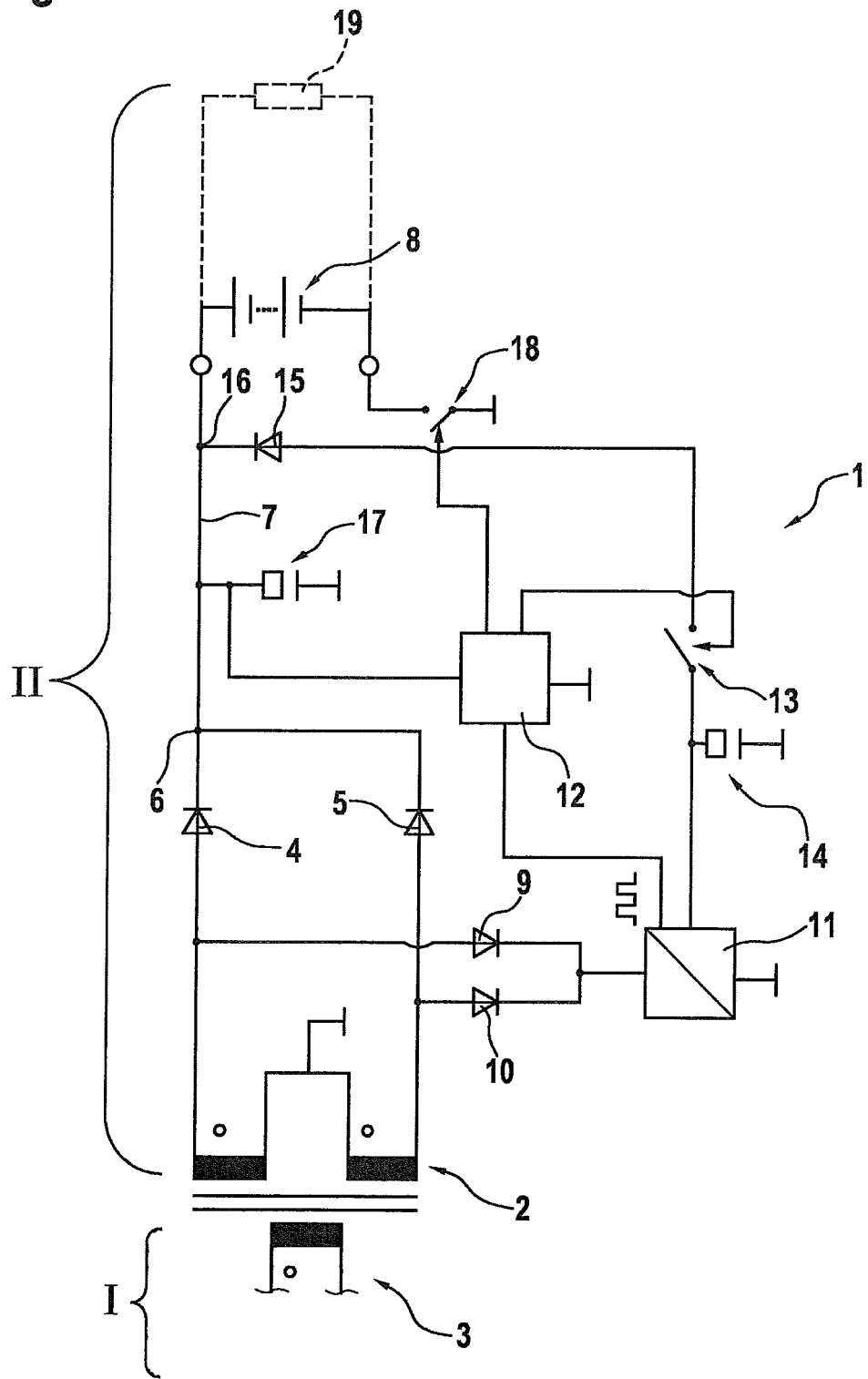
FIG. 1 shows a first exemplary embodiment of a device for the inductive transmission of electrical energy.

FIG. 1 shows a device 1 for an inductive energy transmission in a simplified representation. Device 1 includes an induction coil 2, which serves as secondary coil for receiving energy transmitted from a primary coil 3. Two freewheeling diodes 4 and 5 are connected to the terminals of induction coil 2. The terminals of induction coil 2 then merge at node 6. A line 7, which is connected to a terminal of a rechargeable battery 8, continues from node 6. In addition, lines provided with two diodes 9, 10 in each case branch off from the terminals of induction coil 2, which are merged to form a shared line behind diodes 9, 10 and are routed to the input of a DC voltage converter 11. DC voltage converter 11 is controlled by a control device 12. A first switching element 13 is provided at the output of the DC converter, which is likewise controlled or actuated by control device 12. Furthermore, a capacitor 14 is connected between switching element 13 and DC converter 11. Via a diode 15, switching element 13 is in turn connected to line 7 at a node 16. In line 7, between node 6 and node 16, another capacitor 17 is connected to line 7. Moreover, a further switching element 18 is assigned to the other terminal of battery 8, which, if needed, which may be connects the battery to a grounded connection. A consumer 19, indicated by dashed lines, may optionally be connected to the battery or in place of the battery.

While induction coil 3 represents part of primary side I (not shown further) of the energy transmission system, device 1 constitutes secondary side II.

During operation, that is to say, during an energy transmission process, a communication takes place between primary side I and secondary side II. This communication is managed by a communications device 20, which is essentially made up of control device 12 and DC converter 11. Control unit 12 controls DC converter 11 by specifying a bit pattern, in such a way that it modulates the load of induction coil 2. This load modulation is able to be detected and analyzed on primary side I by a corresponding evaluation unit (not shown here). In this manner, information about the charge state of battery 8, for instance, is able to be transmitted to primary side I. Switching element 18 may be open during the communication or during the load modulation, in order to prevent charging of battery 8 or a supply of consumer 19, so that the charge current or the consumer current does not affect the load modulation. Switching element 18 may be open even if battery 8 may no longer be charged, for example because it has reached its capacity or because a critical temperature has been reached.

Via diodes 9 and 10, DC converter 11 loads the secondary winding of the transformer, i.e., induction coil 2.

If switching element 13 is closed, capacitor 17 will be charged and, if switching element 18 is closed as well, battery 8 will be charged, too. Diode 15 prevents discharging of battery 8 or capacitor 17 into capacitor 14 or into DC converter 11 when switching element 13 is closed. Especially, the control of switching element 13 may be carried out as a function of the voltage applied at capacitor 14. If it exceeds the battery voltage of battery 8, for instance, then switching element 13 will be closed, so that an energy exchange takes place between capacitor 14 and battery 8. A cyclical control of switching element 13 is also conceivable, however.

Figure 2:
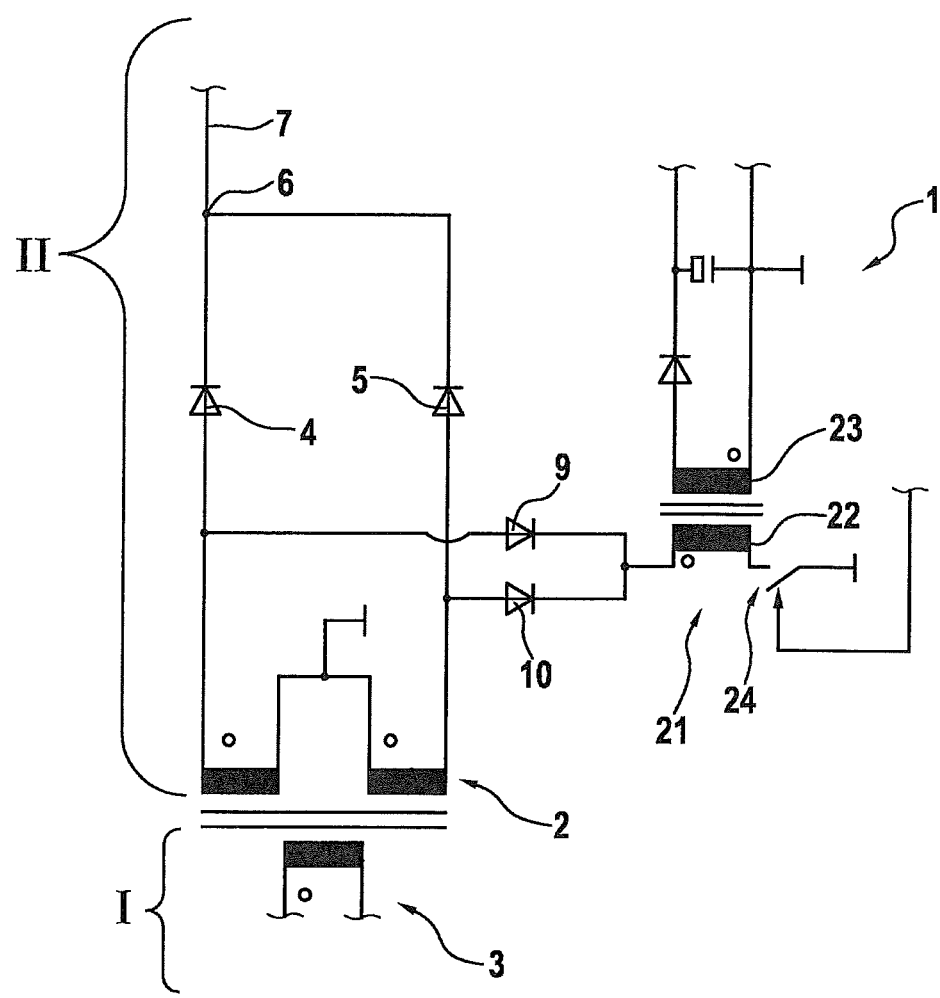
FIG. 2 shows an alternative exemplary embodiment of the device.

FIG. 2 shows an alternative exemplary embodiment of device 1; the elements already known from FIG. 1 have been provided with matching reference numerals, so that reference is made to the above description in this regard.

According to the exemplary embodiment of FIG. 2, the DC voltage converter is embodied as a flyback converter 21, that is to say, as a transformer featuring galvanic isolation. The transformer has an input-side coil 22 and an output-side coil 23, the input-side coil 22 being assigned to induction coil 2, and the output-side coil 23 being assigned to battery 8 or consumer 19. A switching element 24 is connected upstream from input-side coil 22. As a result of fixedly defined on periods for switching element 24, a current detection of the flyback converter current on the input side is dispensed with. For practical purposes, the on time is predefined by communications device 20, in particular by control device 12, via the desired bit length. Flyback converters are basically known, so that a detailed description is dispensed with here. As an alternative to a configuration as a flyback converter, it is also possible to provide what is known as a switched capacitor inverter (inverse converter) without galvanic separation.

What is claimed is:

1. A device for the inductive transmission of electrical energy, comprising:
    at least one induction coil, which is connected or connectible to at least one of a consumer and a rechargeable battery;
    a communications device, which includes at least one control unit and is configured to modulate the load of the induction coil;
    wherein the communications device has a DC converter, whose output is connected or connectible to the at least one of the consumer and the battery, and whose input is connected to the induction coil, the control unit controlling the DC converter for modulating the load,
    wherein the at least one induction coil serves as a secondary induction coil for receiving energy transmitted from a primary induction coil,
    wherein the primary induction coil represents part of a primary side of an energy transmission system, and wherein the device constitutes a secondary side of the energy transmission system,
    wherein during an energy transmission process, a communication takes place between the primary side and secondary side, and
    wherein the communication is managed by the communications device, which includes a control device and the DC converter, wherein the control unit controls the DC converter by specifying a bit pattern, so that it modulates the load of the induction coil.

2. The device of claim 1, wherein at least one first switching element is assigned to the output of the DC converter.

3. The device of claim 1, wherein at least one first capacitor is between the first switching element and the DC converter.

4. The device of claim 1, wherein a second switching element is assigned to the battery, which prevents recharging of the battery in the open state.

5. The device of claim 1, wherein the control unit opens the second switching element while it controls the DC converter for a load modulation.

6. The device of claim 1, wherein a diode is between the first switching element and the battery, which prevents undesired discharging of at least one of the battery and a second capacitor which is disposed between the induction coil and the battery.

7. The device of claim 1, wherein the DC converter includes one of a flyback converter and an inverse converter.

8. The device of claim 1, wherein the DC converter includes a flyback converter which is assigned a third switching element which controls the flyback converter.

9. A method for operating a device for the inductive transmission of electrical energy, the method comprising:
providing at least one induction coil, which is connected or connectible to at least one of a consumer and a rechargeable battery; and
providing a communications device, which includes at least one control unit for a load modulation;
wherein the communications device has a DC converter, whose output is connected to the at least one of the consumer and the battery, and whose input is connected to the induction coil, the control unit controlling the DC converter for a load modulation,
wherein the at least one induction coil serves as a secondary induction coil for receiving energy transmitted from a primary induction coil,
wherein the primary induction coil represents part of a primary side of an energy transmission system, and wherein the device constitutes a secondary side of the energy transmission system,
wherein during an energy transmission process, a communication takes place between the primary side and secondary side, and
wherein the communication is managed by the communications device, which includes a control device and the DC converter, wherein the control unit controls the DC converter by specifying a bit pattern, so that it modulates the load of the induction coil.

10. The method of claim 9, wherein at least one first switching element is assigned to the output of the DC converter.

11. The method of claim 9, wherein at least one first capacitor is between the first switching element and the DC converter.

12. The method of claim 9, wherein a second switching element is assigned to the battery, which prevents recharging of the battery in the open state.

13. The method of claim 9, wherein the control unit opens the second switching element while it controls the DC converter for a load modulation.

14. The method of claim 9, wherein a diode is between the first switching element and the battery, which prevents undesired discharging of at least one of the battery and a second capacitor which is disposed between the induction coil and the battery.

15. The method of claim 9, wherein the DC converter includes one of a flyback converter and an inverse converter.

16. The method of claim 9, wherein the DC converter includes a flyback converter which is assigned a third switching element which controls the flyback converter.

* * * * *